(12) United States Patent
Wang et al.

(10) Patent No.: US 6,724,171 B2
(45) Date of Patent: Apr. 20, 2004

(54) MOVABLE PLUG-HEAD CHARGER

(75) Inventors: Han-Kai Wang, Taipei (TW); Kuang-Hung Yang, Taipei Hsien (TW)

(73) Assignee: Primax Electronics Ltd., Taipei Hsien (TW)

( * ) Notice: Subject to any disclaimer, the term of this patent is extended or adjusted under 35 U.S.C. 154(b) by 0 days.

(21) Appl. No.: 10/063,892

(22) Filed: May 22, 2002

(65) Prior Publication Data

US 2003/0076070 A1 Apr. 24, 2003

(30) Foreign Application Priority Data

Oct. 23, 2001 (TW) ........................................ 90218083 U (51) Int. Cl.[7] .................................................. H02J 7/00
(52) U.S. Cl. ....................................................... 320/111
(58) Field of Search ................................... 320/103–111

(56) References Cited

U.S. PATENT DOCUMENTS

D427,965 S * 7/2000 Wu ............................. D13/107
6,320,353 B1 * 11/2001 Chiu et al. ................... 320/111

* cited by examiner

*Primary Examiner*—Edward H. Tso
*Assistant Examiner*—Pia Tibbits
(74) *Attorney, Agent, or Firm*—Jiang Chyun IP Office (57) ABSTRACT

A movable plug-head for a travel-type battery charger. A metallic n-shaped stationing clamp replaces the conventional plastic clamp and conductive metallic spring plates so that the number of components and thickness of the n-shaped stationing clamp are reduced. Ultimately, material and assembling cost as well as overall thickness of the charger are all reduced.

14 Claims, 8 Drawing Sheets

MOVABLE PLUG-HEAD CHARGER

CROSS REFERENCE TO RELATED APPLICATIONS

This application claims the priority benefit of Taiwan application serial no. 90218083, filed Oct. 23, 2001.

BACKGROUND OF INVENTION

1. Field of Invention

The present invention relates to a movable plug-head. More particularly, the present invention relates to a movable plug-head for a traveling battery charger.

2. Description of Related Art

Information appliances represents another milestone for the electronic industry after the computer revolution. The so-called information appliances refer to a broad category of devices having communication or networking capability and serve as a means to provide information and recreational activities. According to such definition, information appliances may link up with a network to transmit/receive voice messages and network data. For example, mobile telephones, personal digital assistants (PDA), web pads and notebook computers are all regarded as information appliances. In general, rechargeable batteries provide the power necessary for operating information appliances such as mobile telephones, personal digital assistants and notebook computers. To prevent power shortage, many traveling people will carry, aside from a set of spare batteries, a small lightweight battery charger for charging the rechargeable batteries.

Figure 1A:
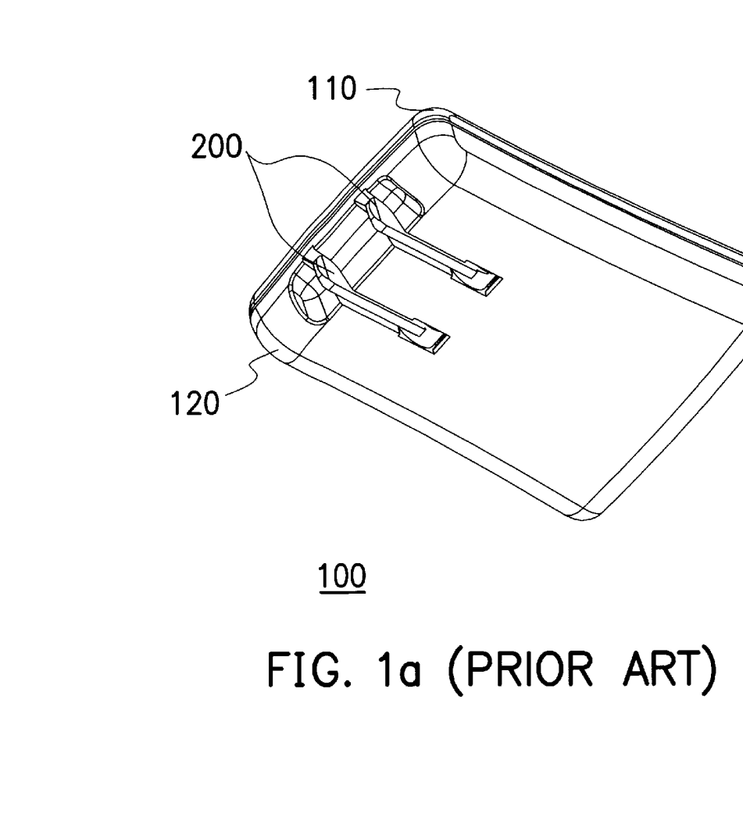
FIGS. 1a and 1b are perspective views of a conventional travel charger.
Figure 1B:
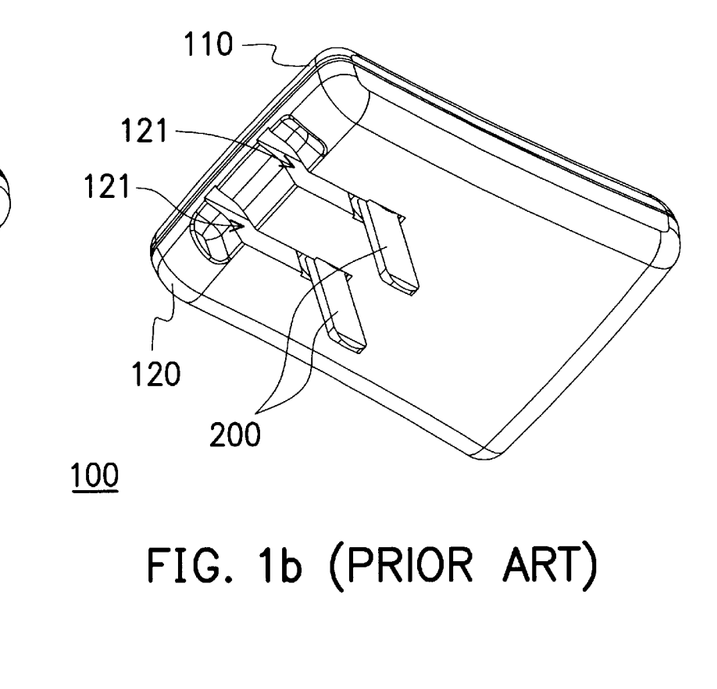

FIGS. 1a and 1b are perspective views of a conventional travel charger. The travel charger has a main body 100 comprised of a top cover 110 and a bottom cover 120. A pair of parallel open grooves 121 is formed on the bottom cover 120 so that the two metal plates 200 of a plug-head may fold out from the main body 100. To reduce volume and increase portability, the metallic plates 200 of the plug-head may be bent back into the open groove 121 as shown in FIG. 1a. To use the charger, the metal plates 200 are turned from a hidden horizontal position to a position vertical relative to the main body 100 as shown in FIG. 1b.

Figure 2A:
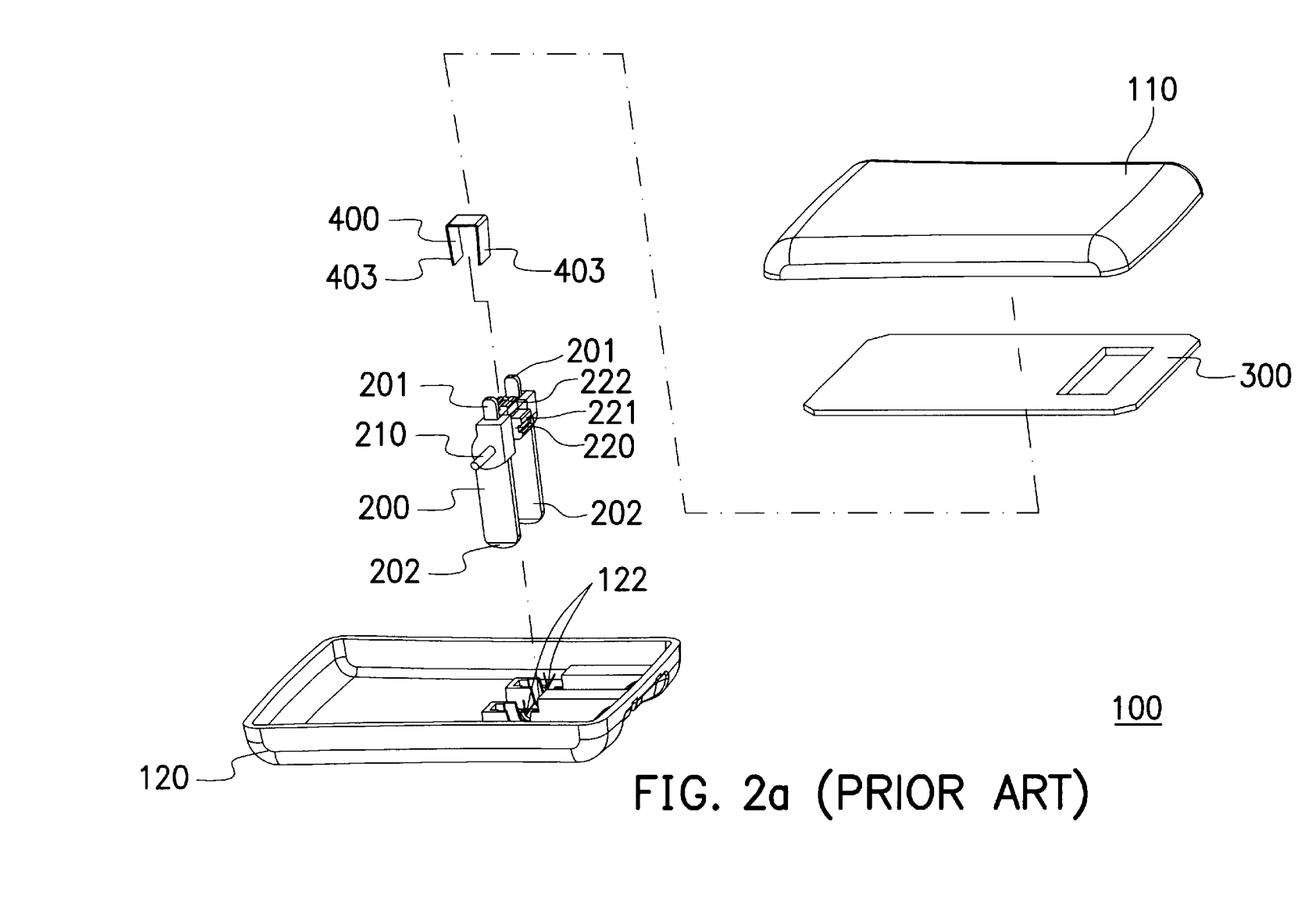
FIGS. 2a to 2c are explosive views showing the components constituting the conventional travel-type charger in FIGS. 1a and 1b.
Figure 2B:
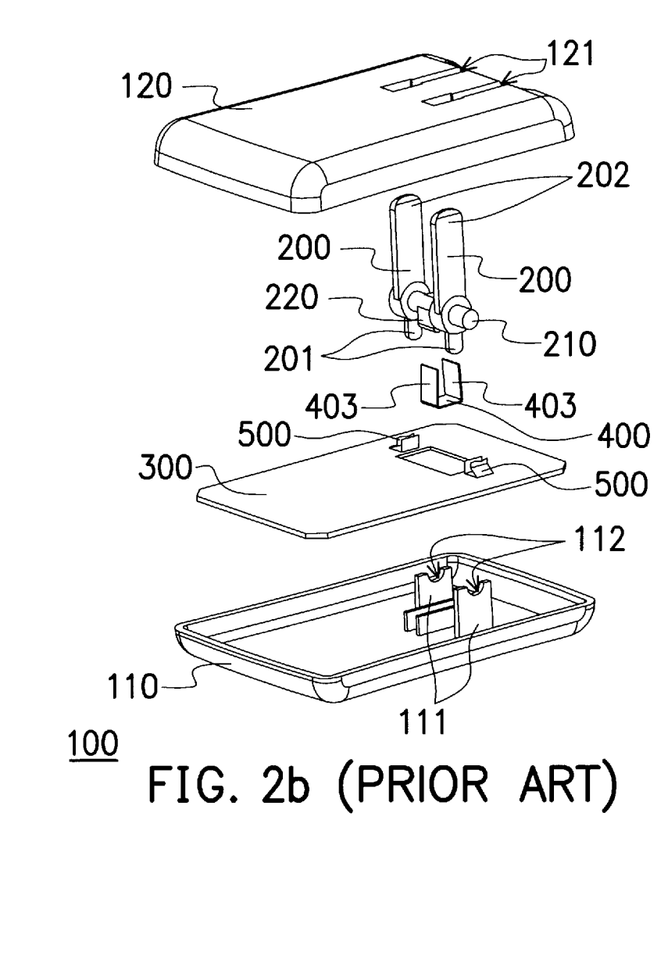
Figure 2C:
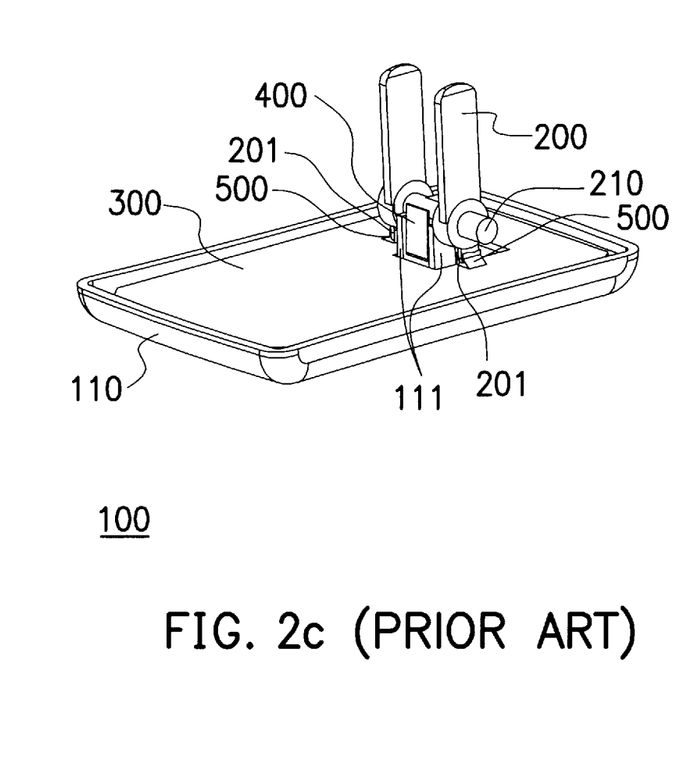

FIGS. 2a to 2c are explosive views showing the components constituting the conventional travel-type charger in FIGS. 1a and 1b. The two metallic plates 200 are connected together through a rotary axle 210. The rotary axle 210 is gripped by a groove 122 on the bottom cover 120. The rotary axle 210 is able to rotate along a groove 112 on a support frame 111 attached to the top cover 110. There is an L-shaped gripping block 220 between the two metallic plates 200. Furthermore, the L-shaped gripping block 220 has end surfaces having a first protruded spine 221 and a second protruded spine 222 thereon respectively. The gripping block 220 is gripped by the two sidewalls 403 of an n-shaped stationing clamp 400. The gripping block 220 and the n-shaped stationing clamp 400 are both made from a non-conductive plastic material. When the metallic plates 200 of the plug-head are folded back into the open grooves 121, the second protruded spine 222 of the gripping block 220 and its other surface are gripped by the two sidewalls 403 of the n-shaped stationing clamp 400. Due to the protruded profile of the spine 222, the sidewalls 403 of the n-shaped stationing clamp 400 expand a little and increase the grip of the gripping block 220. Hence, the metal plates 200 of the plug-head remain in a stable position. On the other hand, as the metal plates 200 rotate to a position vertical to the main body 100, the first protruded spine 221 of the gripping block 220 and its other surface are gripped by the two sidewalls 403 of the n-shaped stationing clamp 400. Similarly, due to the protruded profile of the spine 221, the sidewalls 403 of the n-shaped stationing clamp 400 expand a little and increase the grip of the gripping block 220. Hence, the metal plates 200 of the plug-head remain again in a stable position. With the second ends 202 of the respective metal plates 200 jutting out from the main body 100, the charger may plug into a socket (not shown) to obtain a necessary power source. In the meantime, the first ends 201 at another end of the metal plates 200 are pulled into the main body 100 and gripped by springy clips 500 on a substrate board 300. Hence, the metal plates 200 and contact points on the substrate board 300 are electrically connected.

The conventional travel-type charger mainly uses an n-shaped stationing clamp together with a gripping block having two protruded spines to position the metallic plates of the plug-head either hidden within the main body or exposed outside the main body. In addition, the conventional design also needs a pair of metallic springy clips for electrical connectivity. Thus, more components are required and assembling cost is increased.

SUMMARY OF INVENTION

Accordingly, one object of the present invention is to provide a travel-type battery charger having a metallic n-shaped stationing clamp that functions also as a metallic clip for reducing overall thickness of the charger. In addition, the charger uses fewer components and hence reduces material and assembling cost.

To achieve these and other advantages and in accordance with the purpose of the invention, as embodied and broadly described herein, the invention provides a movable plug-head device suitable for a travel-type battery charger. The charger comprises of a top cover, a bottom cover and a substrate board. The top cover and the bottom cover together form a complete main body with the substrate board enclosed inside the main body. The top cover has two open grooves running parallel to each other. The movable plug-head of this invention includes a plug-head and two stationing clamps. The plug-head is engaged to the inner surface of the bottom cover. The plug-head is composed of two metallic plates, a rotary axle and two clamping blocks. The metallic plates are positioned inside the long and linear open grooves, each a mirror reflection of each other. The metallic plates have a first end and a second end. The first end of the metallic plates extends into the main body. The rotary axle is attached to the metallic plates close to the first end. The rotary axle is mounted inside the main body so that the metallic plates may rotate from a horizontal position inside the open grooves to a vertical position with the second end of the metallic plates exposed outside the bottom cover of the main body.

The clamping blocks are positioned at the respective first end of the metallic plates. The clamping blocks have a first planar surface, a second planar surface, a third planar surface and a fourth planar surface. The first planar surface and the second planar surface are perpendicular to each other. The third planar surface and the first planar surface are parallel to each other. The fourth planar surface and the second planar surface are parallel to each other. The first planar surface has a first protruded spine and the second planar surface has a second protruded spine.

The two stationing clamps are attached to the inner surface of the bottom cover. The stationing clamps are made using a conductive material. Each stationing clamp has two gripping spring plates, a first spring plate and a second spring plate. The first spring plate is attached to and electrically connected with the substrate board. The two spring plates are roughly parallel to each other. Each stationing clamp grips a clamping block. The second spring plate is in contact with the second end of the metallic plate after the metallic plate is turned from a position inside the open groove to a vertical position relative to the bottom cover. When the metallic plates are retracted into the open groove, the spring plates of each stationing clamp grip the second protruded spine and the fourth planar surface of the clamping block respectively. On the other hand, when the metallic plates are rotated into a vertical position relative to the bottom cover, the spring plates of each stationing clamp grip the first protruded spine and the third planar surface of the clamping block respectively.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Reference will now be made in detail to the present preferred embodiments of the invention, examples of which are illustrated in the accompanying drawings. Wherever possible, the same reference numbers are used in the drawings and the description to refer to the same or like parts.

Figure 3A:
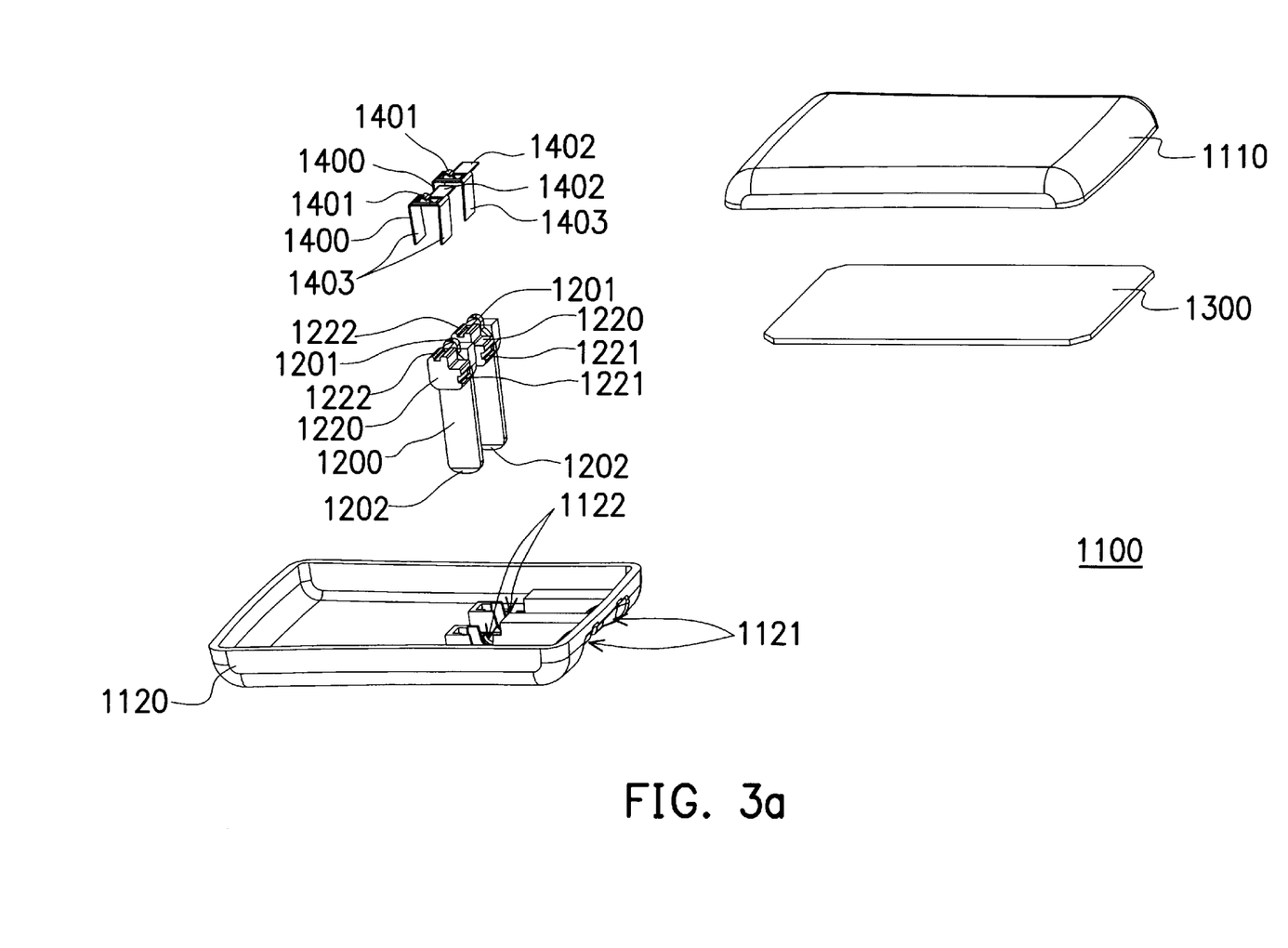
FIGS. 3a to 3c are explosive views showing the components of a travel type battery charger according to one preferred embodiment of this invention.
Figure 3B:
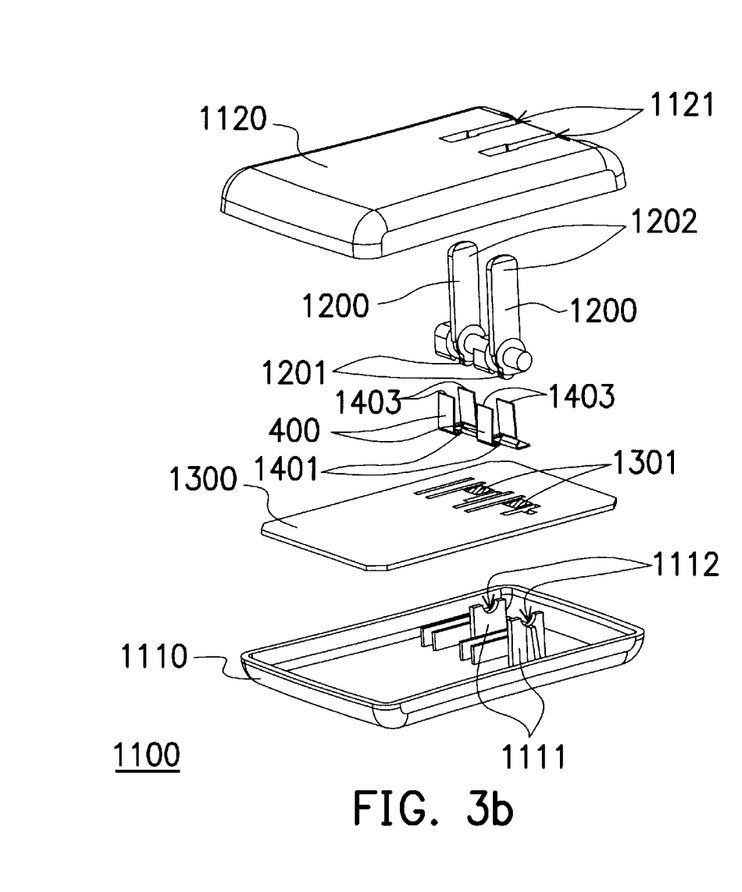
Figure 3C:
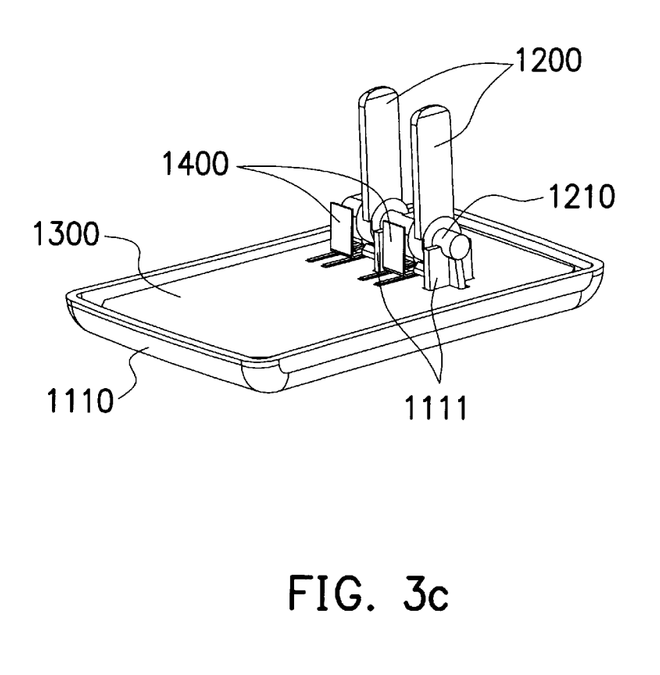

FIGS. 3a to 3c are explosive views showing the components of a travel type battery charger according to one preferred embodiment of this invention. The main body 1100 of the battery charger comprises of a top cover 1110 and a bottom cover 1120. The bottom cover 1120 has two mutually parallel open grooves 1121 for retracting a pair of metallic plates 1200 into the main body 1100.

Figure 4A:
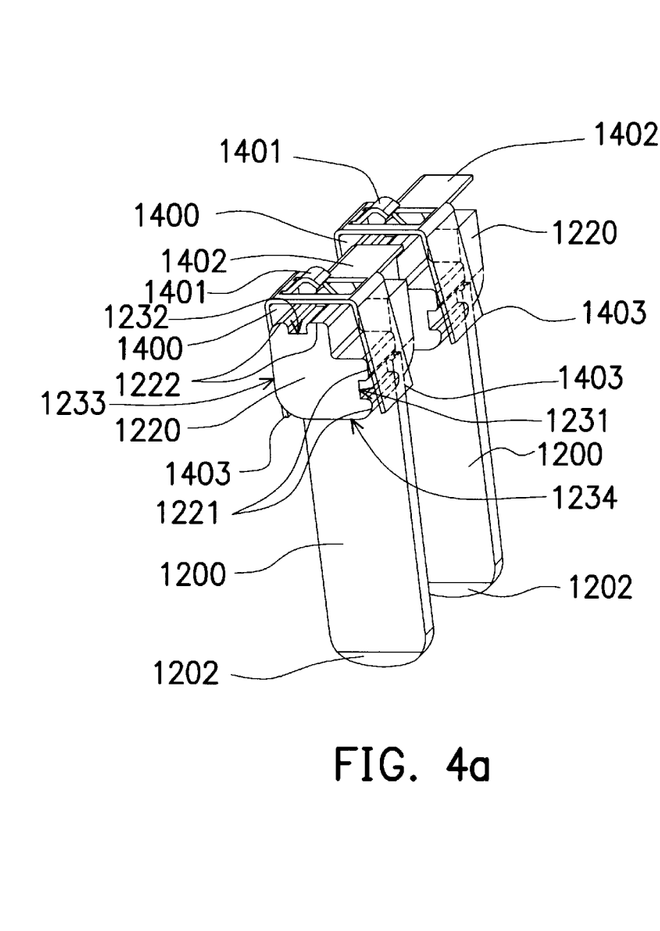
FIGS. 4a and 4b are perspective views showing in detail the movable plug-head according to one preferred embodiment of this invention.
Figure 4B:
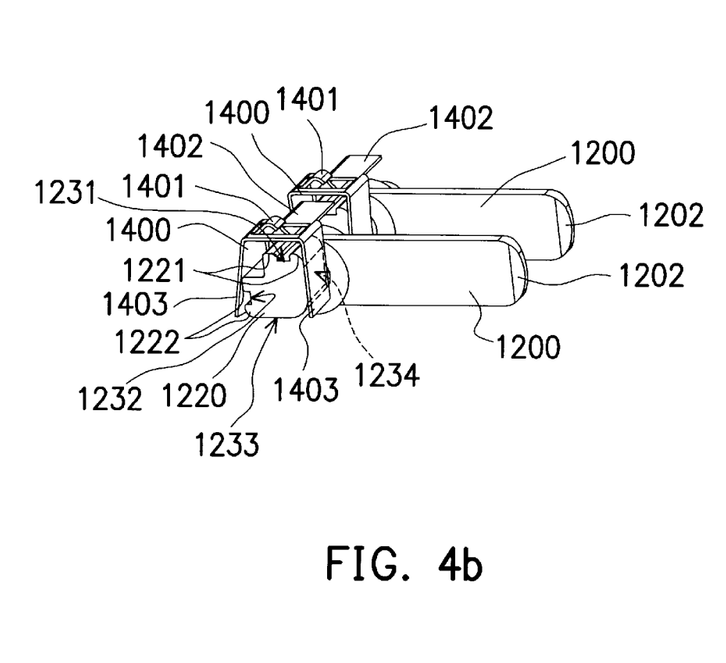

The two metallic plates 1200 are joined together through a rotary axle 1210. The rotary axle 1210 is constrained between a groove 1122 on the bottom cover 1120 and another groove 1112 on a support frame 1111 on the top cover 1110. However, the rotary axle 1210 is free to rotate. An L-shaped clamping block 1220 is attached to a position near the first end 1201 of each metallic plate 1200. Referring to FIGS. 4a and 4b, the L-shaped clamping block 1220 has two mutually perpendicular surfaces, a first planar surface 1231 and a second planar surface 1232. The first planar surface 1231 and the second planar surface 1232 have a first protruded spine 1221 and a second protruded spine 1222 respectively. The clamping block 1220 is locked in position by the two spring plates 1403 of a stationing clamp 1400. The clamping block 1220 is made from a plastic non-conductive material.

Figure 5A:
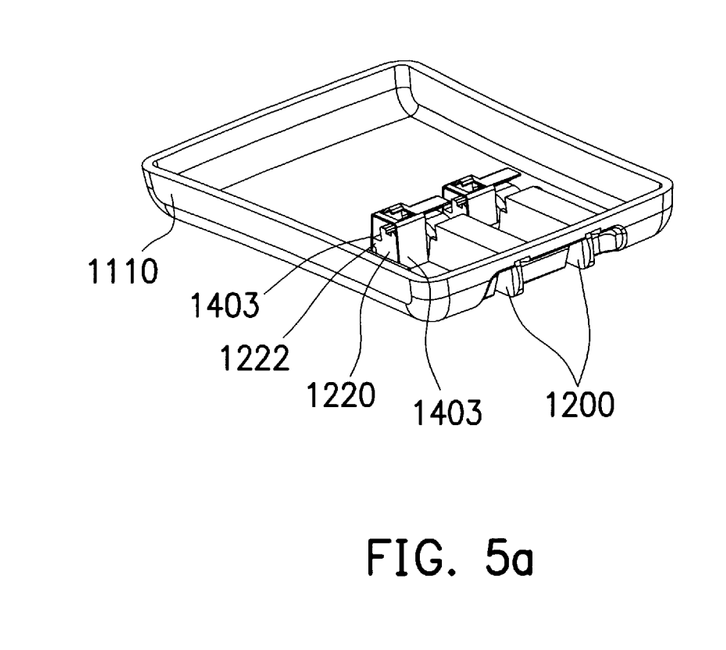
FIGS. 5a and 5b are perspective views showing the movable plug-head of this invention in the closed position.
Figure 5B:
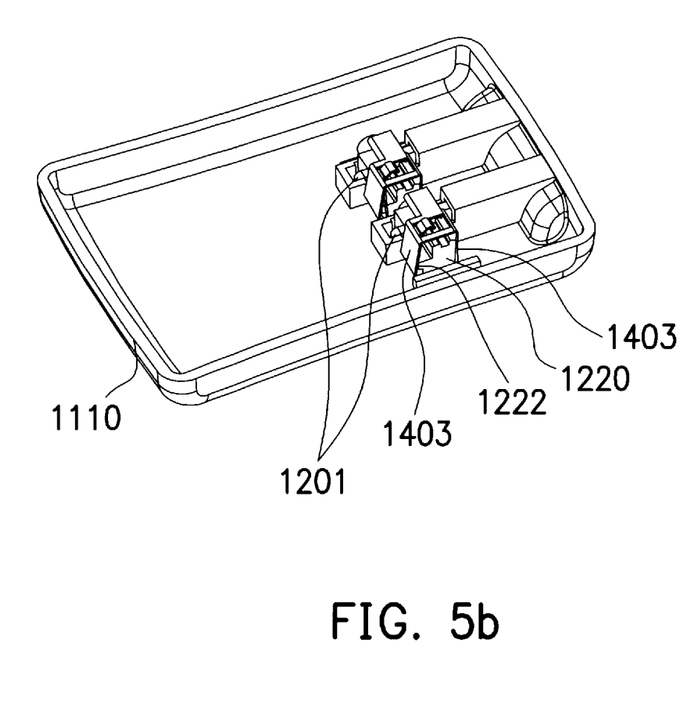
Figure 6A:
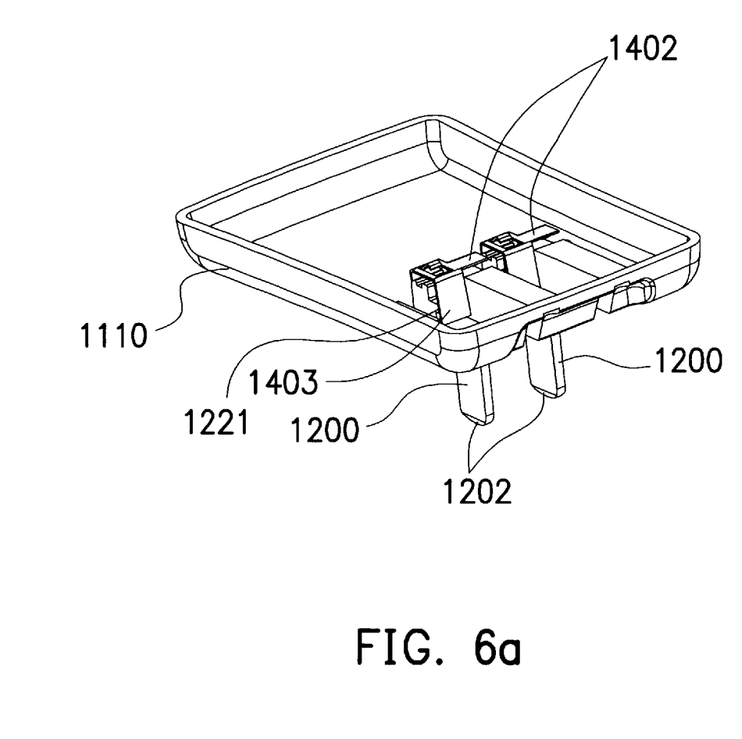
FIGS. 6a and 6b are perspective views showing the movable plug-head of this invention in the open position.
Figure 6B:
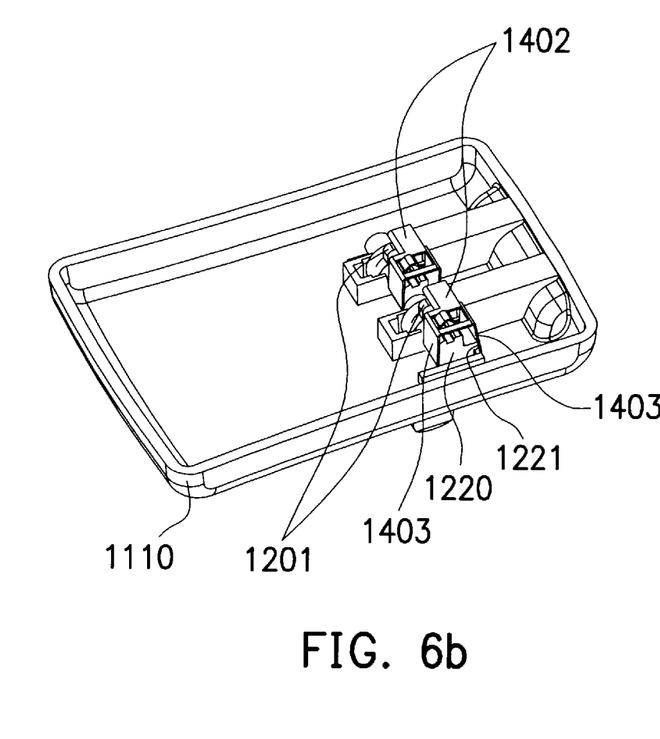

As the metallic plates 1200 fold into the open grooves 1121, the second protruded spine 1222 and the fourth planar surface 1234 of the clamping block 1220 are tightly gripped by the two spring plates 1403 of the stationing clamp 1400. Moreover, due to protruded profile of the second spine 1222, the two spring plates 1403 of the stationing clamp 1400 are forced outward, leading to a greater spring force and a better grip of the metallic plates 1200 in a stationary position. This can be observed in FIGS. 4b, 5a and 5b. When the metallic plates 1200 rotate to a vertical position relative to the main body 1100, the first protruded spine 1221 and the third planar surface 1233 of the clamping block 1220 are tightly gripped by the two spring plates 1403 of the stationing clamp 1400. Furthermore, due to the protruded profile of the first spine 1221, the two spring plates 1403 of the stationing clamp 1400 are forced outward leading to a greater spring force and a better grip of the metallic plates 1200 in a stationary position. This can be observed in FIGS. 4a, 6a and 6b. Since the second end 1202 of the metallic plates 1200 is now exposed outside the main body 1100, the charger may be plugged into a socket (not shown) to receive the necessary power. Meanwhile, the first end 1201 of the metallic plates 1200 inside the main body 1100 is in contact with a second spring plate 1402 of the stationing clamp 1400. Because a first spring plate 1401 of the stationing clamp 1400 is in contact with a conductive pad 1301 on the substrate board 1300, the metallic plates 1200 and the substrate board 1300 are electrically connected.

In this invention, the stationing clamp 1400 serves as a position stationing device and the spring plates 1403 serve as a grip for the metallic probes (the metallic plates 1200). Hence, the metallic probes of the charger may be pulled out from the main body 1100 and locked in position for engaging with a socket. The metallic probes may also be retracted into the main body 1100 and again locked in position when the charger is no longer in use. The stationing clamp 1400 is made from a flexible conductive material such as phosphor bronze or beryllium bronze.

In conclusion, major advantages of this invention includes:

1. A metallic n-shaped stationing clamp replaces the conventional plastic clamp and conductive metallic spring plates so that the number of components is minimized. Hence, material and assembling cost are reduced.

2. A skinnier n-shaped stationing clamp is formed when metallic instead of plastic material is used. Ultimately, overall thickness of the travel-type battery charger is reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A movable plug-head for a travel-type battery charger, wherein the charger comprises a main body that includes a top cover and a bottom cover and a substrate board enclosed inside the main body, and the bottom cover has a pair of parallel open grooves, the movable plug-head comprising:

a plug mounted on the inner surface of the bottom cover, wherein the plug comprises two metallic plates, a rotary axle and two clamping blocks; wherein the metallic plates are enclosed inside the open grooves having a long linear shape parallel to each other similar to mirror reflection, and each metallic plate has a first end and a second end with the first end extended into the main body; the rotary axle and the metallic plates are joined together near the first end and mounted inside the main body so that the metallic plates are free to rotate from a horizontal position inside the open grooves to a vertical position relative to the bottom cover, exposing the second end of the metallic plates outside the main body;

the clamping blocks are positioned around the first end of the metallic plates, each clamping block has a first planar surface, a second planar surface, a third planar surface and a fourth planar surface, the first planar surface and the second planar surface are perpendicular to each other, the third planar surface and the first planar surface are parallel to each other, the fourth planar surface and the second planar surface are parallel to each other, the first planar surface has a first protruded spine and the second planar surface has a second protruded spine; and a pair of stationing clamps mounted in the interior of the bottom cover, wherein the stationing clamps are made from a conductive material and include two gripping spring plates, a first spring plate and a second spring plate, the first spring plate contacts and electrically connects with the substrate board, the pair of gripping spring plates are roughly parallel to each other, the spring plates of each stationing clamp grip a clamping block, and the second end of the metallic plates are in contact with the second spring plates when the metallic plates are pulled from the horizontal position inside the open grooves to a vertical position perpendicular to the bottom cover;

wherein the spring plates of each stationing clamp grip the second protruded spine and the fourth planar surface of the clamping block when the metallic plates are retracted to a horizontal position inside the open grooves, and the spring plates of each stationing clamp grip the first protruded spine and the third planar surface of the clamping block when the metallic plates are pulled out to a vertical position relative to the bottom cover.

2. The movable plug-head of claim 1, wherein material used in the fabrication of the stationing clamp includes flexible metallic material.

3. The movable plug-head of claim 2, wherein material used in the fabrication of the stationing clamp includes phosphor bronze.

4. The movable plug-head of claim 2, wherein material used in the fabrication of the stationing clamp includes beryllium bronze.

5. A travel-type battery charger, comprising:

a main body having a top cover and a bottom cover, wherein the bottom cover has two parallel open grooves;

a substrate board inside the main body; and a movable plug-head having a plug and two stationing clamps; wherein the plug mounts on the interior surface of the bottom cover, the plug includes two metallic plates, a rotary axle and two clamping blocks;

the metallic plates are enclosed inside the open grooves having a long linear shape parallel to each other similar to mirror reflection, and each metallic plate has a first end and a second end with the first end extended into the main body;

the rotary axle and the metallic plates are joined together near the first end and mounted inside the main body so that the metallic plates are free to rotate from a horizontal position inside the open grooves to a vertical position relative to the bottom cover exposing the second end of the metallic plates outside the main body;

the clamping blocks are positioned around the first end of the metallic plates; and the stationing clamps mounted in the interior of the bottom cover, wherein the stationing clamps are made from a conductive material and include two gripping spring plates, a first spring plate and a second spring plate, the first spring plate contacts and electrically connects with the substrate board, the pair gripping spring plates is roughly parallel to each other, the spring plates of each stationing clamp grip a clamping block, the second end of the metallic plates are in contact with the second spring plates when the metallic plates are pulled from the horizontal position inside the open grooves to a vertical position perpendicular to the bottom cover.

6. The travel-type battery charger of claim 5, wherein each clamping block has a first planar surface, a second planar surface, a third planar surface and a fourth planar surface, the first planar surface and the second planar surface are perpendicular to each other, the third planar surface and the first planar surface are parallel to each other, the fourth planar surface and the second planar surface are parallel to each other, the first planar surface has a first protruded spine and the second planar surface has a second protruded spine.

7. The travel-type battery charger of claim 6, wherein the spring plates of each stationing clamp grip the second protruded spine and the fourth planar surface of the clamping block when the metallic plates are retracted to a horizontal position inside the open grooves, and the spring plates of each stationing clamp grip the first protruded spine and the third planar surface of the clamping block when the metallic plates are pulled out to a vertical position relative to the bottom cover.

8. The travel-type battery charger of claim 5, wherein material used in the fabrication of the stationing clamp includes flexible metallic material.

9. The travel-type battery charger of claim 8, wherein material used in the fabrication of the stationing clamp includes phosphor bronze.

10. The travel-type battery charger of claim 8, wherein material used in the fabrication of the stationing clamp includes beryllium bronze.

11. A movable plug-head for a travel-type battery charger, wherein the battery charger comprises a main body, a metallic probe and a substrate board, the metallic probe may switch between a hiding position and a functioning position, when the metallic probe is in the hiding position, the metallic probe is enclosed inside the main body, and when the metallic probe is in the functioning position, the metallic probe is exposed outside the main body, the movable plug-head comprising of:

a stationing device made from conductive material and enclosed inside the main body, wherein the stationing device contacts and connects electrically with the substrate board, the stationing device has a springy gripping component for gripping the metallic probe so that the metallic probe may be stationed in either the hiding position or the functioning position, and the metallic probe and the stationing device are electrically connected in the functioning position.

12. The movable plug-head of claim 11, wherein material used in the fabrication of the stationing device includes flexible metallic material.

13. The movable plug-head of claim 12, wherein material used in the fabrication of the stationing device includes phosphor bronze.

14. The movable plug-head of claim 12, wherein material used in the fabrication of the stationing device includes beryllium bronze.

* * * * *